Aug. 11, 1931.  L. MAMBOURG  1,818,232
SHEET FORMING MECHANISM
Filed March 18, 1926   3 Sheets-Sheet 1

Inventor
Leopold Mambourg
By Frank Fraser.
Attorney

Aug. 11, 1931.  L. MAMBOURG  1,818,232
SHEET FORMING MECHANISM
Filed March 18, 1926    3 Sheets-Sheet 2
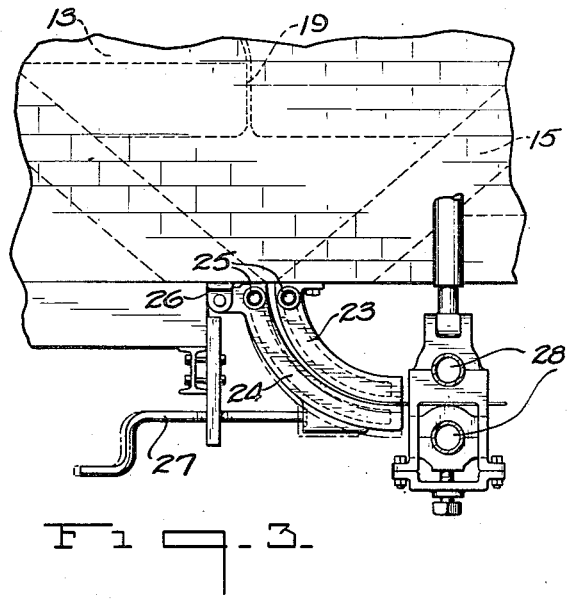
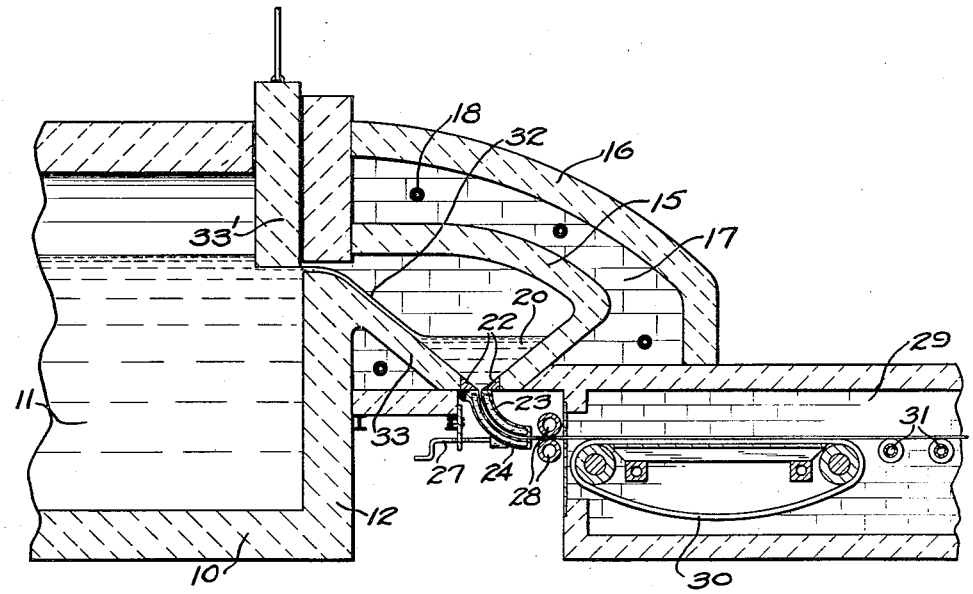
Inventor
Leopold Mambourg
By Frank Fraser,
Attorney Aug. 11, 1931.  L. MAMBOURG  1,818,232
SHEET FORMING MECHANISM
Filed March 18, 1926   3 Sheets-Sheet 3

Inventor
Leopold Mambourg
By Frank Fraser
Attorney

Patented Aug. 11, 1931

1,818,232

UNITED STATES PATENT OFFICE

LEOPOLD MAMBOURG, OF LANCASTER, OHIO, ASSIGNOR TO LIBBEY-OWENS-FORD GLASS COMPANY, OF TOLEDO, OHIO, A CORPORATION OF OHIO

SHEET FORMING MECHANISM

Application filed March 18, 1926. Serial No. 95,577.

The present invention relates to sheet glass apparatus.

An important object of the invention is to provide an apparatus wherein a flow of glass is produced under the head pressure of its source, the flow of glass being passed between suitable guide members to reduce it to sheet form.

Another object of the invention is to provide a receptacle having an orifice therein, whereby a flow of glass may flow therefrom under the head pressure of the glass in said receptacle, the flow of glass passing between adjustable curved guide shoes for reducing the same to sheet form.

Still another object of the invention is to provide apparatus of this nature, wherein a sheet of glass, particularly well adapted for use as a plate glass blank, may be rapidly formed, the sheet formed being flat and of a uniform thickness, permitting the same when used as a plate glass blank to be surfaced in a minimum amount of time.

A further object of the invention is to provide a sheet glass forming apparatus, wherein a receptacle is provided with an orifice so located that a flow of glass is permitted to flow therefrom under the head pressure of glass in said receptacle, the flow passing between the surfaces of non-corrosive metallic alloy guide shoes which are curved in a manner that the flow is preferably introduced in a substantially vertical plane, while the sheet is removed in a substantially horizontal plane.

Other objects and advantages of the invention will become apparent during the course of the following description.

Figure 1:
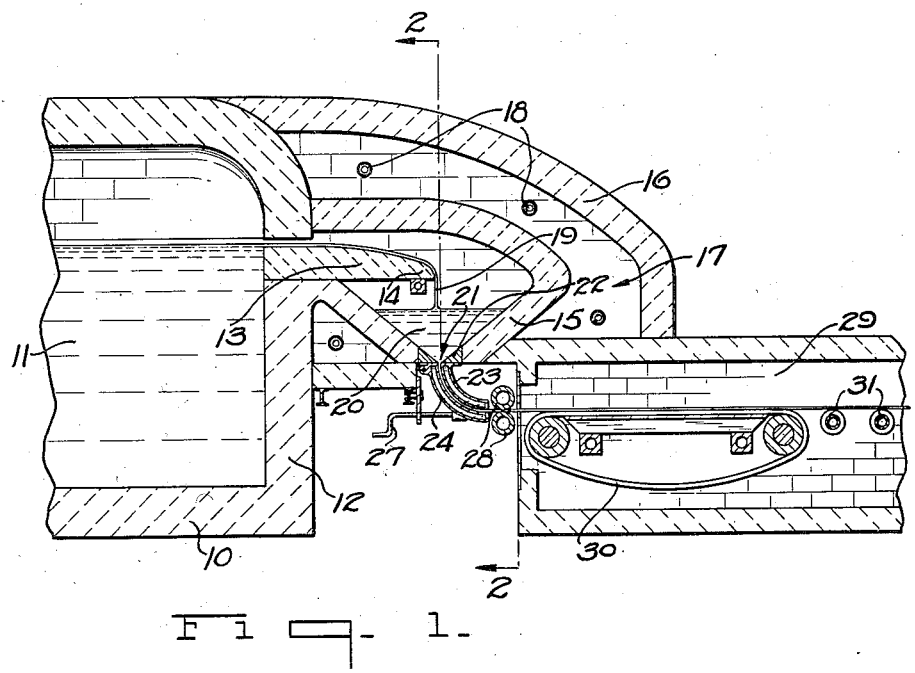
Figure 2:
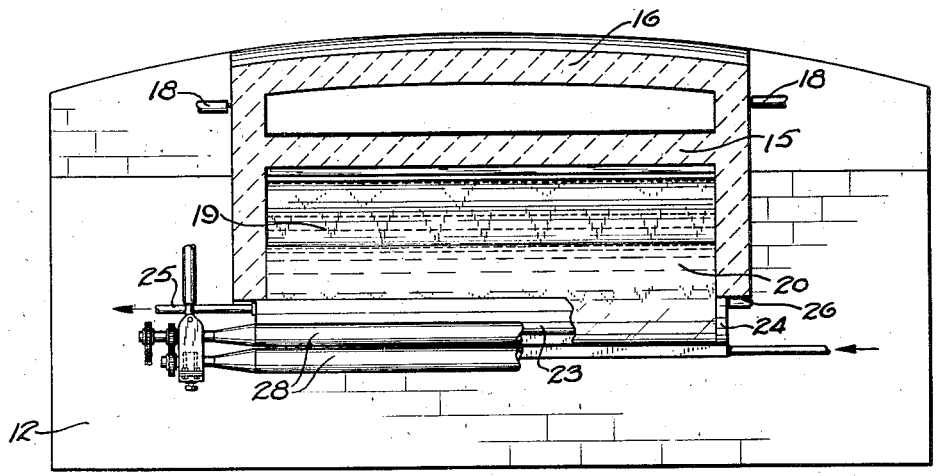
Figure 5:
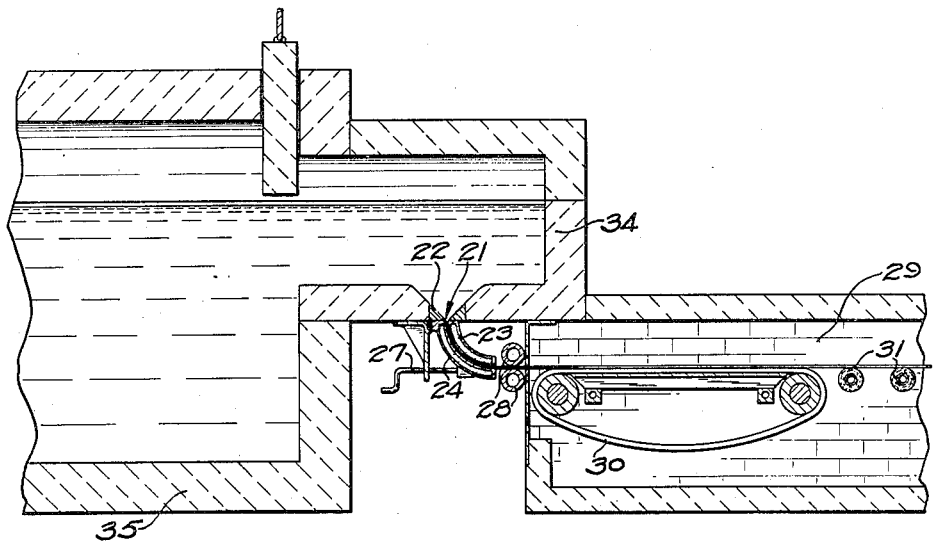
Figure 6:
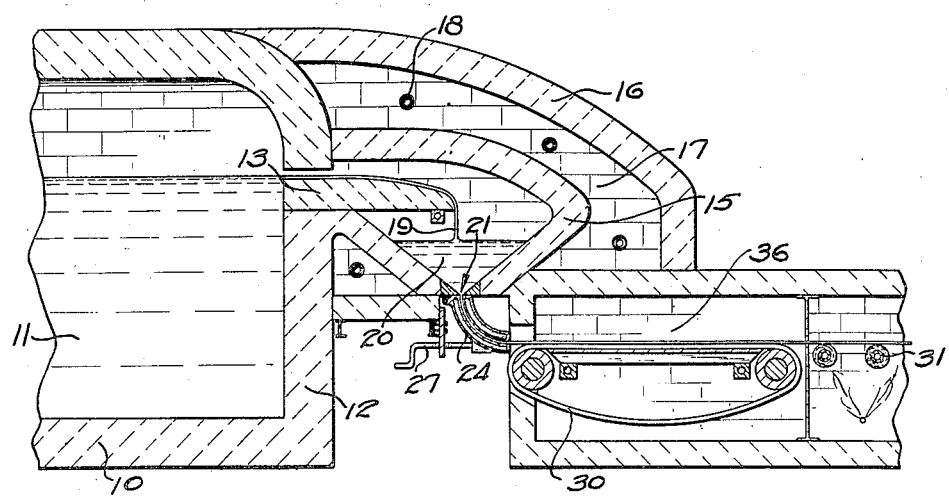

In the drawings wherein like numerals are employed to designate like parts throughout the same, Fig. 1 is a fragmentary vertical longitudinal section through my improved apparatus, Fig. 2 is a section on line 2—2 in Fig. 1, Fig. 3 is an enlarged detail view, and Figs. 4, 5 and 6 are vertical longitudinal sections through slightly modified forms of construction.

In the drawings the numeral 10 designates a tank furnace containing a mass of molten glass 11. The end wall 12 of the tank furnace 10 has associated therewith, in Fig. 1, an overflow lip 13, the outer end 14 of which is arranged within a suitable receptacle 15. The receptacle 15, as shown in Fig. 1, is of a trough-like formation, and is surrounded by a suitable housing 16 forming a chamber 17 in which may be located heating members 18. The molten glass 11 is permitted to overflow the lip 14 in a stream 19. A quantity of glass 20 is preferably maintained in the receptacle 15. Arranged preferably in the bottom of the receptacle 15 is an orifice 21, the walls of the receptacle 15 being provided with the preferably non-corrosive alloy portions 22 to permit the glass 20 to pass through said orifice in a better condition than if the non-corrosive portions were not used.

Associated with the orifice 21 is a pair of guide shoes 23 and 24. The guide shoes are preferably formed from a non-corrosive highly polished metallic alloy, such as nichrome, monel, stellite, etc., and are so constructed that a temperature controlled medium may be circulated therethrough. The guide member 23 is preferably mounted rigidly, while the member 24 may be pivotally mounted as at 25 in Fig. 3. A suitable bracket 26 is rigidly supported, permitting the pivotal connection 25. A crank 27 is diagrammatically shown for operating the guide member 24. By adjusting the guide member 24, the gap between the two guide members may be varied to permit various thicknesses of sheets of glass to be produced as required.

The guide shoes 23 are curved in a manner that the glass may be introduced therein in the form of a flow in a substantially vertical plane, while the sheet is removed therefrom preferably in a substantially horizontal plane.

As shown in Fig. 1, a pair of rolls 28 are adapted to engage the sheet as it leaves the guide members 23 and 24. The sheet may then be passed into the chamber 29, being supported, if desired, upon an endless belt or the like 30, after which it is passed upon the rolls 31 which support the sheet during annealing.

Fig. 4 is slightly different from the construction shown in Fig. 1, in that the overflow lip 14 is dispensed with, and the film of glass 32 is permited to flow down one of the walls 33 of the receptacle 15. An adjustable shear cake 33' may be used to control the amount of glass permitted to flow into said receptacle.

In Fig. 5 a receptacle 34 is used instead of the trough-like receptacle 15, the receptacle 34 being an extension of the tank furnace 35. The sheet forming mechanism is associated with the extension 34 in a manner similar to its association with the receptacle 15.

In Fig. 6, the supporting rolls 28 have been eliminated, and the receptacle 36 has been moved relatively closer to the exit end of the sheet forming shoes.

In operation, a quantity of molten glass is continuously produced in the tank furnace 10, the level therein being controlled to permit the desired overflow into the receptacle 15. A flow of glass is permitted to pass through the orifice 21 under the head pressure of the mass of glass 20 contained in said receptacle 15. The flow passes in an arcuate path between the sheet forming members 23 and 24, the sheet forming members being so arranged that the sheet preferably issues therefrom in a substantially horizontal plane, permitting the said sheet to be flattened, if desired, and passed through an annealing leer without being deflected.

A sheet of glass formed with any of the above described constructions will be very well adapted for use as a plate glass blank, as it will be flat and of a uniform thickness throughout. The manufacture of plate glass is made considerably more easy if the blank used is flat and of a uniform thickness.

The speed at which the sheet is formed may be controlled by the head pressure maintained in the receptacle 15 or 34, while the thickness of sheet is controlled by the relative positions of the two members. The temperature around the receptacles may be maintained at the best working temperature, while the temperature of the guide shoes may also be controlled.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In sheet glass apparatus, a receptacle containing a mass of molten glass, means for causing a flow of glass to pass therefrom under the head pressure of the glass in said receptacle, and a pair of substantially parallel curved members for reducing the flow to sheet form.

2. In sheet glass apparatus, a receptacle containing a mass of molten glass, means for causing a flow of glass to pass therefrom under the head pressure of the glass in said receptacle, and a pair of substantially parallel adjustable curved guide members for reducing the flow to sheet form.

3. In sheet glass apparatus, a receptacle containing a mass of molten glass, means for causing a flow of glass to pass therefrom under the head pressure of the glass in said receptacle, a pair of substantially parallel curved guide members for reducing the flow to sheet form, and means for controlling the temperature of said guide members.

4. In sheet glass apparatus, a receptacle containing a mass of molten glass, means for causing a flow of glass to pass therefrom under the head pressure of the glass in said receptacle, and a pair of substantially parallel curved non-corrosive guide members between which the glass passes to be reduced to sheet form.

5. In sheet glass apparatus, a receptacle containing a mass of molten glass, means for causing a flow of glass to pass therefrom under the head pressure of the glass in said receptacle, a pair of substantially parallel curved non-corrosive guide members between which the glass passes to be reduced to sheet form, and means for controlling the temperature of the guide members.

6. In sheet glass apparatus, a receptacle containing a mass of molten glass and having an orifice in the bottom thereof, and a pair of substantially paralled curved shoes beneath the orifice for reducing the flow to sheet form and for deflecting the sheet during formation thereof from the vertical into the horizontal.

7. In sheet glass apparatus, a receptacle containing a mass of molten glass and having an orifice in the bottom thereof, and a pair of substantially parallel curved non-corrosive shoes beneath the orifice for reducing the flow to sheet form and for deflecting the sheet during formation thereof from the vertical into the horizontal.

8. In sheet glass apparatus, a receptacle containing a mass of molten glass, and having an orifice in the bottom thereof, a pair of substantially parallel curved shoes beneath the orifice for reducing the flow to sheet form and for deflecting the sheet during formation thereof from the vertical into the horizontal, and means for controlling the temperature of the shoes.

9. In sheet glass apparatus, a receptacle containing a mass of molten glass, and having an orifice therein through which a flow of glass may pass under the head pressure of the glass in said receptacle, and a curved pivotal guide member associated with said orifice for receiving the flow of glass therefrom and deflecting it from a substantially vertical plane into a substantially horizontal plane.

10. In sheet glass apparatus, a receptacle containing a mass of molten glass, and having an orifice therein through which a flow of glass may pass under the head pressure of the glass in said receptacle an arcuately curved pivotal guide member associated with the orifice for receiving the flow of glass therefrom and deflecting it from a substantially vertical plane into a substantially horizontal plane, and a pair of rotary members adjacent said guide member for receiving the glass as it passes therefrom.

11. In sheet glass apparatus, a receptacle containing a mass of molten glass, and having an orifice therein through which glass may pass under the head pressure of the glass in said receptacle, a pair of curved guide members associated with the orifice for receiving the flow of glass therefrom and deflecting it from a substantially vertical plane into a substantially horizontal plane, and a pair of rotary members adjacent the guide members for receiving the glass as it passes therefrom.

12. In sheet glass apparatus, a receptacle containing a mass of molten glass, and having an orifice therein through which glass may flow under the head pressure of the glass in said receptacle, and a pair of curved guide members between which the flow may pass to be reduced to sheet form, said guide members receiving the glass in a substantially vertical plane, and delivering the sheet therefrom in a substantially horizontal plane.

13. In sheet glass apparatus, a receptacle containing a mass of molten glass and having an orifice therein through which the glass may flow under the head pressure of the glass in said receptacle, and a pair of adjustable curved guide members between which the flow may be passed to be reduced to sheet form, said guide members receiving the glass in a substantially vertical plane and delivering the sheet therefrom in a substantially horizontal plane.

14. In sheet glass apparatus, a receptacle containing a mass of molten glass and having an orifice therein through which the glass may flow under the head pressure of the glass in said receptacle, a pair of adjustable curved guide members between which the flow may be passed to be reduced to sheet form, said guide members receiving the glass in a substantially vertical plane and delivering the sheet therefrom in a substantially horizontal plane, and means for controlling the temperature of said guide members.

15. In sheet glass apparatus, a receptacle containing a mass of molten glass, means for causing a flow of glass to pass downwardly therefrom under the head pressure of the glass in said receptacle, curved guide members for reducing the flow to sheet form and for deflecting the sheet during formation thereof from a substantially vertical plane into a substantially horizontal plane, and means for controlling said head pressure.

16. In sheet glass apparatus, a receptacle containing a mass of molten glass, means for causing a flow of glass to pass therefrom under the head pressure of the glass in said receptacle, substantially parallel curved guide members for reducing the flow to sheet form, and means for controlling said head pressure.

17. In sheet glass apparatus, a receptacle containing a mass of molten glass, means for causing a flow of glass to pass downwardly therefrom, and stationary means for receiving the downflow of glass and reducing it to sheet form, said stationary means engaging opposite surfaces of the glass flow and deflecting the same during the reduction thereof to sheet form from a substantially vertical plane into a substantially horizontal plane.

Signed at Lancaster, in the county of Fairfield and State of Ohio, this 15th day of March, 1926.

LEOPOLD MAMBOURG.